United States Patent [19]

Nadeau et al.

[11] Patent Number: 5,191,909
[45] Date of Patent: Mar. 9, 1993

[54] TRANSIT MIX TRUCK DUST HOOD ASSEMBLY

[75] Inventors: Ronald P. Nadeau, Syracuse; Frank V. Smith, Jr., Marcellus, both of N.Y.

[73] Assignee: Griffin Environmental Co., Inc., Syracuse, N.Y.

[21] Appl. No.: 680,160

[22] Filed: Apr. 3, 1991

[51] Int. Cl.⁵ .......................................... E04H 15/14
[52] U.S. Cl. .................................... 135/93; 135/87; 454/63
[58] Field of Search ...................... 135/87, 93; 454/63, 454/65, 67

[56] References Cited

U.S. PATENT DOCUMENTS

| | | | |
|---|---|---|---|
| 1,774,072 | 8/1930 | Whitmore | 454/67 |
| 1,906,352 | 5/1933 | Whitmore | 454/67 |
| 2,137,862 | 11/1938 | Steins | 454/67 |
| 3,766,844 | 10/1973 | Donnelly | 135/93 |
| 4,177,975 | 12/1979 | Meyers | 454/63 |
| 4,231,289 | 11/1980 | Domicent | 135/93 |
| 4,318,337 | 3/1982 | Wichmann | 454/65 |

Primary Examiner—Henry E. Raduazo
Attorney, Agent, or Firm—Wall and Roehrig

[57] ABSTRACT

A drive-through dust hood assembly for transit mix trucks is provided by a pair of side curtains that are pivotally mounted on a top closure panel and which cooperate to close about the end of a truck and the mouth of the mixer drum to capture any dust created by filling thereof. The side curtains may be pivoted from the closed positon to an extended position for easy transit mix truck access when not exhausting dust. The side curtains of the closure are made of flexible sheet material that will conform to the irregular size and shape of various style trucks, so that filling dust does not escape to the ambient air. The exhausted dust is captured in a bag house or other suitable filtration facility for reuse or subsequent disposal. Swinging curtain closures are used for the back of the truck to permit efficient closing of the back area while allowing easy pivoting of the curtains should the truck not fully clear the open assembly.

9 Claims, 4 Drawing Sheets

TRANSIT MIX TRUCK DUST HOOD ASSEMBLY

BACKGROUND OF THE INVENTION

This invention relates to an environmental hood for collecting pollutants and more particularly to a truck hood for capturing and collecting dust and other pollutants from a truck filling operation in which the truck is being filled with particulate matter.

In the typical batch plant for filling transit mix cement trucks the individual trucks generally are filled with a dry mix of the appropriate materials from the batch plant from a hopper or series of hoppers which introduce the materials into the truck mixer drum through a chute directed into the mouth of the mixer drum. The water stream for the mix is generally narrow and may be introduced after the dry materials. Even when introduced simultaneously there still is a significant amount of airborne dust created in the filling operation. Since trucks come in all sizes and shapes with filling being accomplished anywhere from the front to the back of the truck, depending on make and model, the problem of capturing dust from the dry particulate materials to meet current environmental standards has become more and more difficult. A batch plant to be successful must be able to service a wide variety of truck types and styles and yet must also meet the increasingly tight environmental regulations as to dust and other pollutant emissions.

In the past, various types of hoods have been proposed and used under certain conditions for enclosing the filling end of a truck when the dry particulate materials are fed into the truck. The dust created is generally removed through an exhaust system which usually includes a filter bag house of some type to filter out the dust and other contaminate material from the exhaust air. The exhaust hoods have been limited in use and application because of the difficulty the batch operator and truck driver have encountered in maneuvering the truck into proper position under the exhaust hood. Drivers have been particularly concerned with not being able to see the filling chute and therefore have had considerable difficulty in properly aligning the truck. As a result the hoods heretofore available have been frequently damaged or completely neglected because of the difficulty of use. Also a number of prior art hoods have required that the truck be backed into them which because of the size and complexity of transit mix trucks makes this is a particularly difficult task. Some efforts have been made to provide drive through hood arrangements but it has been particularly difficult to properly capture the dust at the filling point of the truck with this type of enclosure.

OBJECTS OF THE INVENTION

Accordingly it is an object of the present invention to provide an improved transit mix truck hood for enclosing and exhausting the area about the mouth of a mixer drum being filled with dry particulate material.

It is another object of the present invention to provide a dust hood assembly for transit mix trucks that overcomes the shortcomings of the prior art.

It is another object of the present invention to provide a transit mix truck dust hood assembly that can be easily and simply retracted out of the way of the truck during positioning of the truck underneath the filling chute.

It is another object of the present invention to provide a transit mix truck dust hood assembly that can be retracted out of the line of vision of the batch operator as the truck is maneuvered into position underneath the filling chute.

It is another object of the present invention to provide a drive through type of dust hood assembly in which the enclosure can be retracted out of the way sufficiently to permit the truck to be driven straight through without having to back into position under the filling chute.

It is another object of the present invention to provide a drive through dust hood assembly for transit mix trucks that substantially enclose the truck after it has driven to the filling position under the hood assembly so as to efficiently capture substantially all of the dust and particulate matter ejected into the ambient air during the filling operation.

In one particular embodiment of this invention this is accomplished by providing a pair of shell like side panels made of a flexible sheeting material such as canvas or rubber that can be opened to a widely spread apart condition so that a truck can be easily driven therebetween and then closed together about the truck to essentially enclose the entire filling end of the truck and the filling chute positioned in the mouth of the mixing drum. A pair of swinging curtain extensions and the flexible fabric curtains on the side panels securely enclose the truck filling operation when an exhaust fan draws air from the enclosure.

DESCRIPTION OF THE DRAWINGS

Further objects of the invention together with additional features contributing thereto and advantages accruing therefrom will be apparent from the following description of a preferred embodiment shown in the drawings wherein.

DESCRIPTION OF A PREFERRED EMBODIMENT

Figure 1:
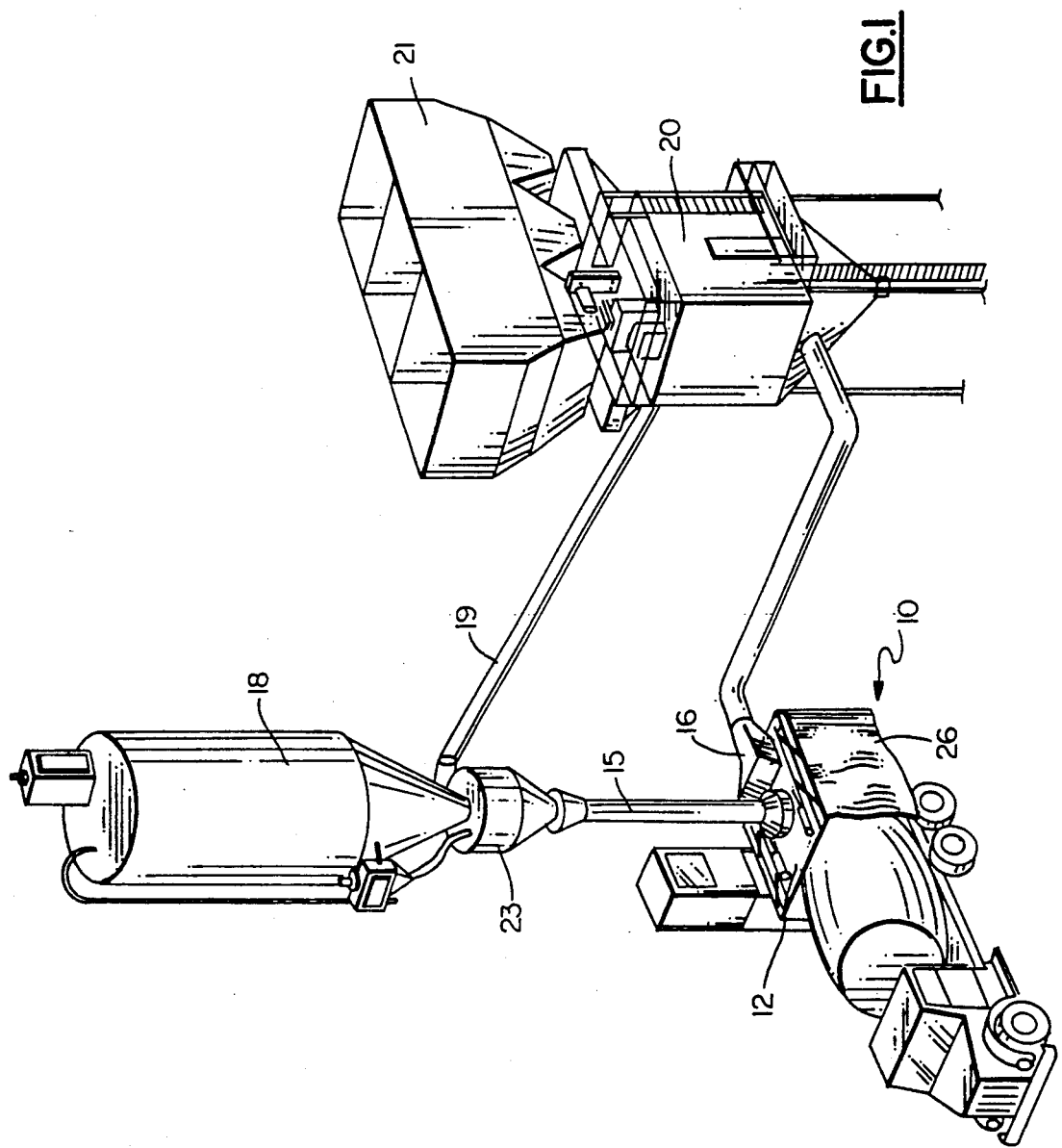
FIG. 1 is a perspective view of a batch plant equipped in accordance with the present invention.

Referring now to FIG. 1 the dust hood assembly 10 includes a top panel member 12, mounted on a frame 14. Panel 12 is connected to a filling chute 15 and an exhaust duct 16. The filling chute 15 is connected at the other end to the usual cement silo 18 and the exhaust duct 16 is connected to a dust collector bag house 20.

Also connected to the top panel 12 and frame 14 along the sides thereof are a pair of top side panels 22 and 24 which in turn carry side curtains 26 and 28. Curtains 26 and 28 are flexible and hang down from panels 22 and 24 about the sides of a truck. Curtains 26 and 28 extend around the back of the enclosure carried by pivoted arms 30 and 32 to enclose the back of a truck positioned underneath the hood assembly 10. The extended curtains 26 and 28 carried on the arm 30 and 32 form a pair of swinging "back doors" 50 and 52 which will be described in more detail herein. The side curtains 26 and 28 are made from a flexible sheet material such as Neoprene, rubber, canvas or the like that is generally air and dust tight and yet flexible enough to conform about the sides of the usually odd shaped transit mix trucks. The flexible sides are particularly advantageous in that they conform to the semicylindrical shapes of the mixer drums and also wrap around the various frame members of the truck so as minimize leakage of air into and through the dust hood assembly. The pick up through the duct work 16 of dust created by the filling operation is thus maximized.

Figure 2:
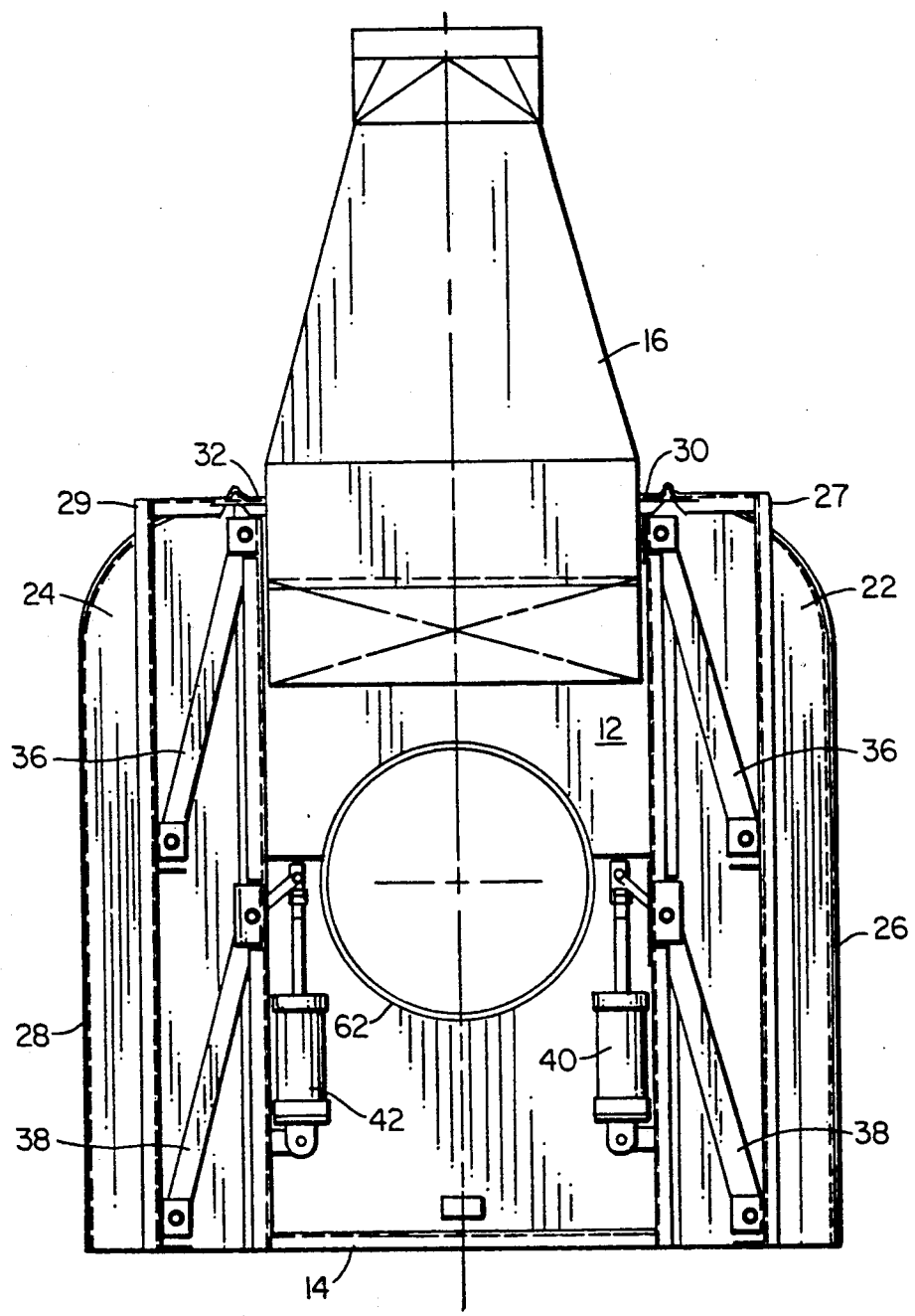
FIG. 2 is a top plan view of the dust hood assembly of the present invention in the closed position.
Figure 3:
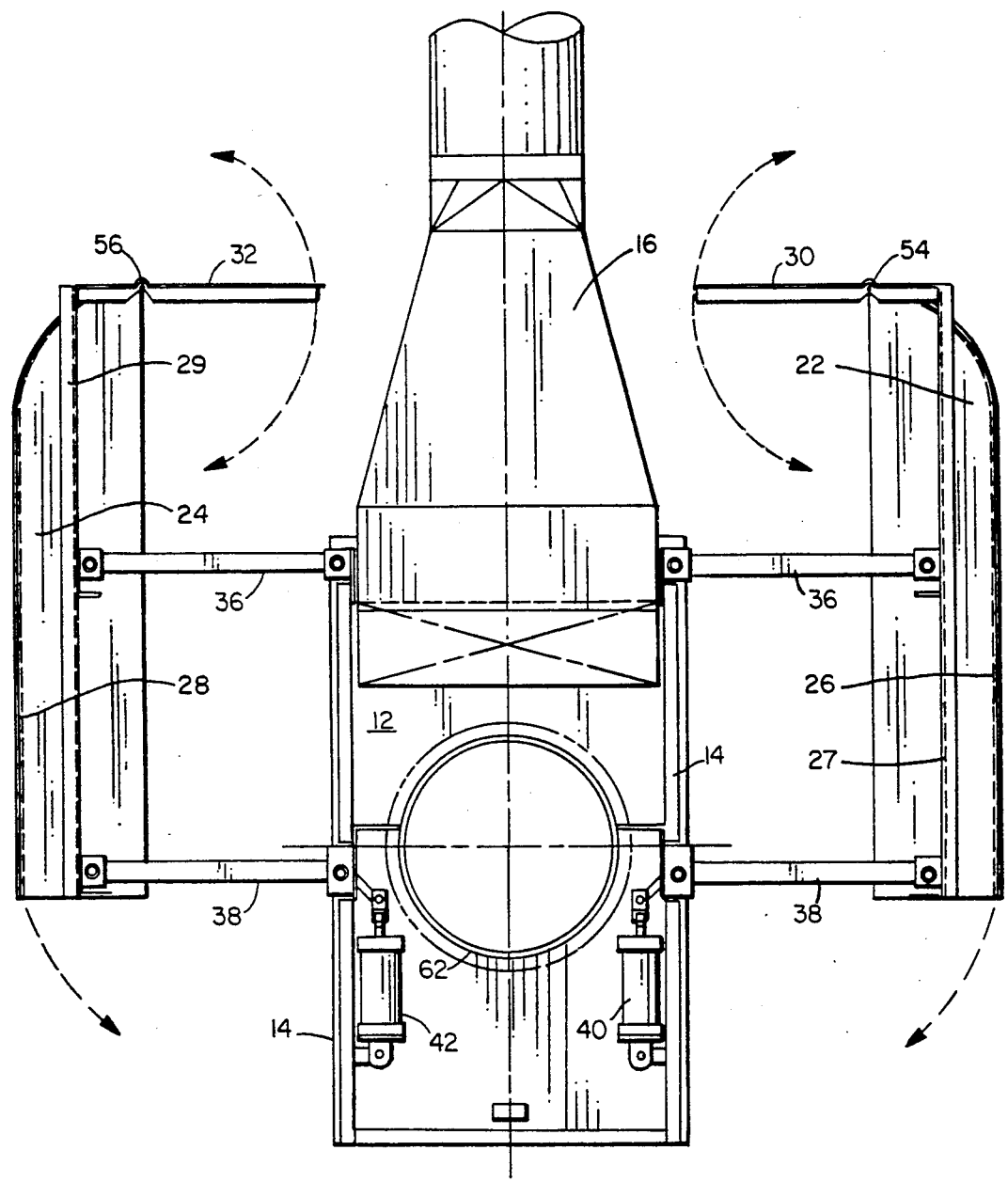
FIG. 3 is a view similar to FIG. 2 of the dust hood assembly in the open position.

As may be seen in FIGS. 2 and 3, the top side panels 22 and 24 are mounted on frame work 27 and 29 and carry the flexible side curtains 26 and 28 along the edge thereof. As can be seen in FIGS. 2 and 3, the side curtains 26 and 28 drape downwardly from the top panels 22 and 24 and extend down about the sides of the truck well over and enclosing the filling mouth of the mixing barrel. The side frame members 27 and 29 are pivotally joined to the main upper frame 14, each by a pair of pantograph arms 36 and 38. The arms 36 and 38 are pivotally connected at one end to the frame 14 and at the other end to the frame 27 and 29 and are arranged so that in the closed position they are nearly parallel to the side portions of the frame 14. In the open position the arms 36 and 38 are perpendicular to the side portions of frame 14. As shown in FIGS. 2 and 3, a pair of cylinders 40 and 42 are connected to short levers 44 and 46, which are fixed at the other end to the arms 38 on each side of the main frame 12. In this manner as the cylinders are actuated the arms can be rotated to the perpendicular condition of FIG. 3 as the piston rod is retracted into the cylinders 40 and 42 which pivots the side curtain members 26 and 28 to the outer open position shown in FIG. 3.

Figure 4:
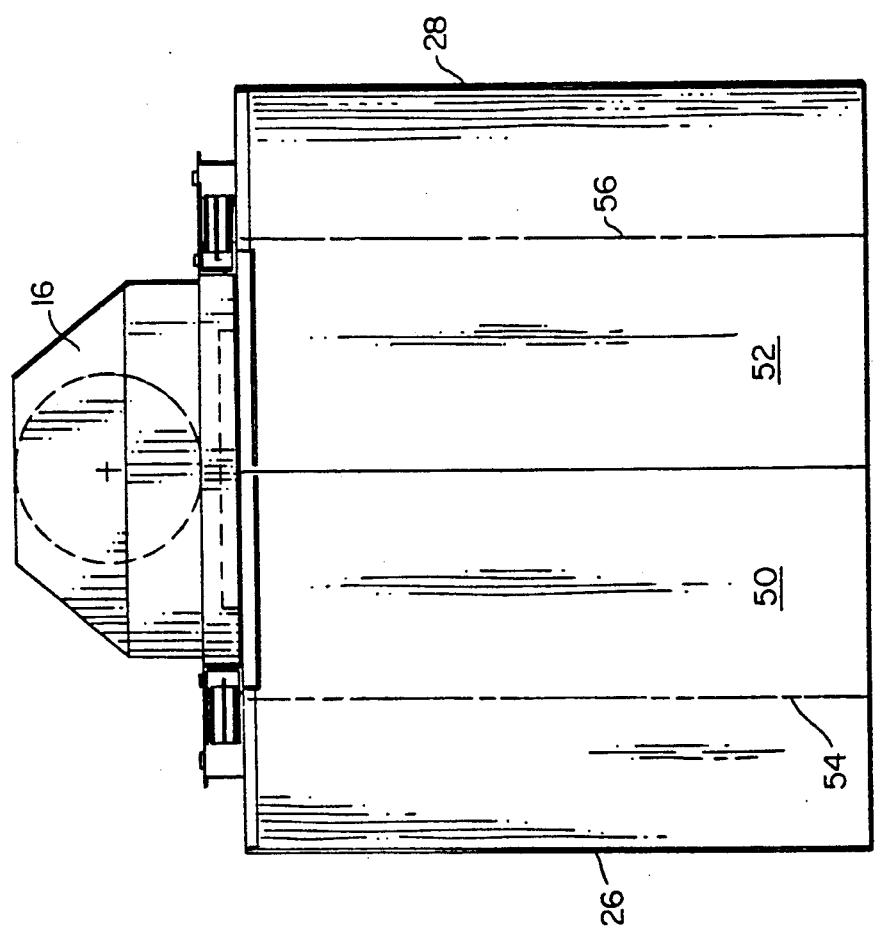
FIG. 4 is a rear end view of the dust hood assembly in the closed position.

As can be seen in FIGS. 3 and 4, the back of the enclosure comprises two "swinging doors" 50 and 52. Pivoted arms 30 and 32 carry an extension of side curtains 26 and 28 to form the "doors". Arms 30 and 32 are double-hinged at 54 and 56 so they can be moved in either direction about the hinge points. Thus the "doors" 50 and 52 will move out of the way if hit by a truck whether the truck is backing into the dust hood assembly or whether it is driving through, either before or after filling. As may be seen in FIGS. 2 and 3, the duct work 16 is connected to a rectangular opening 60 in the top panel 12 and at the other end to the bag house 20 as previously described. This permits the exhausting of air from within the enclosure formed by the side curtains 26 and 28 and the top panel member 12, side panels 22 and 24, and "doors" 50 and 52. The chute 15 is lowered into the circular opening 62 also cut in the top panel 12 which can be readily aligned with the opening in the cement mixer drum for filling of the cement and other particulate material as is customary in the industry.

An aggregate bin 21 is provided for different types of aggregate which feeds via belt conveyer 19 to batcher 23. Batcher 23 also receives cement from the silo 18 and feeds the mixture to the mixer drum on the transmit mix truck through the chute 15. Since this material is essentially dry it will be appreciated a considerable amount of dust and small fines of particulate matter will be generated by the filling action which if not captured and filtered out would be released to the surrounding ambient air.

Referring now to FIG. 4 it will be seen that when the two side curtains 26 and 28 are in the closed position of FIG. 2 that the back end of the truck will be completely enclosed by the "swinging doors" 50 and 52 to complete the enclosure of the truck around the filling chute and the mouth of the mixer drum. These extensions of side curtains 26 and 28 are sized so that in the closed position they completely close off the back while in the open position they allow considerable clearance. As a safety and convenience factor, if the truck does not line up with the center of the hood the arms 30 and 32 are double hinged to allow swinging in or out as necessary to clear the truck through the dust hood assembly.

In operation the dust hood assembly is opened to the position shown in FIG. 3 and the truck is driven through the hood enclosure assembly until the mouth of the mixer drum is positioned beneath the chute 15. The hood structure is then closed by actuating cylinders 40 and 42 to the position of FIG. 2. This substantially encloses the area where the dust is generated. This can be done at the back end of the truck or for a front filling truck it can be wrapped around the front end to effectively form a closure about the filling aperture of the mixer drum. After the hood is closed and the exhaust system turned on the filling can commence and the hood structure shown will pick up substantially all of the dust particles, particulate material fines and the like that are generated by the filling action and stirred up in the air about the mouth of the mixing drum. This material is drawn off through the duct work 16 to the bag house 20 where it is filtered out and the air returned to the atmosphere in a clean condition. The particulate material is then collected and reused or disposed of as the case may be.

While this invention has been explained with reference to the structure disclosed herein, it is not confined to the details set forth and this application is intended to cover any modifications and changes as may come within the scope of the following claims:

What is claimed is:

1. A dust hood assembly for enclosing a particulate material filling aperture in a truck to capture dust created by the filling operation which comprises:
   a generally rectangular top frame member spaced from the ground so as to extend over top of a truck;
   a top panel mounted on said frame member having filling chute and exhaust hood openings therein;
   first and second top side panel member pivotally mounted on said top frame member and extending outwardly therefrom;
   first and second side curtain members mounted on the outer edges of said top side panel members and extending downwardly about the sides of a truck parked under said top frame member;
   a pair of back curtain members mounted at the back end of said side curtain members generally perpendicularly to said side curtain members to form an end closure for the dust hood assembly;
   means for moving said top side panels from a position closely adjacent to the sides of said top frame member to an extended position away from the sides of said top frame member;
   so that when said panels are in the extended position a driver may freely drive a truck under the hood assembly to position the truck for filling, and when the hood assembly is closed about the truck during the filling operation the dust of filling will be captured by an exhaust fan drawing air therefrom.

2. A dust hood assembly according to claim 1 wherein said side panels are each connected to said frame member by a pair of pantograph arms; and said means for moving said side panels includes a cylinder connected to one arm of each pair of pantograph arms to extend and retract said panels.

3. A dust hood assembly according to claim 1 wherein said back curtain members comprise an extension of said side curtains fixed at the top to a pair of swinging arms extending across the back of a truck parked under the assembly and the side and back curtains are formed of a flexible sheet material to wrap about the truck sides to form a substantially dust tight enclosure about the material filling aperture when said assembly is connected to an exhaust fan to draw air therefrom.

4. A dust hood assembly according to claim 1 further including duct means connected to said exhaust hood opening in said panel; and exhaust fan and filter means connected to said duct means to draw air from around a truck parked under said hood assembly to carry away the dust from the filling operation and remove it from the ambient air.

5. A dust hood assembly according to claim 1 wherein said first and second top side panel members comprise left and right hand panel frame members;

two pair of arms, each pair pivotally connected at one end to said left and right hand panel frame members and at the other end to the left and right hand side of said top frame member respectively, a curtain of flexible sheet material attached along the outer edges of said first and second top side panel members extending downwardly from the top of said top side panel members to engage about the sides of a truck parked thereunder when said panel frame members are retracted in close juxtaposition to the sides of said top frame member.

6. A drive through dust hood assembly for cement mixer trucks comprising a rectangular top frame enclosure member, positioned at a height above the ground sufficient to allow a cement truck to pass thereunder;

an exhaust duct connected to said enclosure member;

a filling duct connected to said enclosure member;

a pair of side curtain members pivotally mounted at the top sides of said top frame enclosure member;

said side curtain members having a closed and an extended position, relative to a truck positioned beneath said top frame enclosure;

air cylinder means for moving said side curtain members from a closed, to an extended position; and said side curtain members being formed of a flexible sheet material extending downwardly to engage the sides of a truck positioned thereunder, so that said curtain members will tend to wrap around the sides of the truck when in the closed position and air is exhausted from said exhaust duct.

7. A drive through dust hood assembly according to claim 6 wherein said side curtain members extend around one half of the back end of a truck when in the closed position to complete the enclosure of the filling duct.

8. A drive through dust hood assembly according to claim 7 wherein said side curtain member extensions are mounted on a pair of arms pivotally fixed to the back end of said side curtain members so as to be pivoted out of the way when engaged by a truck passing under said hood assembly.

9. A drive through dust hood assembly according to claim 6 further including a pair of swinging curtain extensions, one mounted on the back end of each side curtain member substantially at right angles thereto, so that when said side curtain members are in the closed position the doors enclose the back end of a truck positioned within said hood assembly for filling; and said swinging doors will pivot out of the way when contacted by a truck driving through said hood assembly.

* * * * *